Dec. 25, 1934. W. PRIELIPP 1,985,795
SHEET PILING
Filed March 24, 1933

Inventor:
W. Prielipp
By: Marks & Clerk
Attys.

Patented Dec. 25, 1934

1,985,795

UNITED STATES PATENT OFFICE 1,985,795

SHEET PILING

Walther Prielipp, Dortmund, Germany, assignor to the firm Vereinigte Stahlwerke Aktiengesellschaft, Dusseldorf, Germany Application March 24, 1933, Serial No. 662,601
In Germany March 9, 1931

2 Claims. (Cl. 61—60)

This invention relates to sheet piling near waterways, which consists of rolled or composite I-shaped sections having connections in the outer zone. Since for reasons of economy I-beams are chosen whose flanges have the greatest possible width, edges or connecting parts projecting beyond the normal wall line owing to obliquely ramming of the piling constitute a danger to the vessels as well as to the piling, as vessels passing these projecting members or touching them might become attached thereto and damage themselves and the piling.

According to the invention, these sources of danger are avoided by curving the outer faces of the sheet piling, i. e., the flanges, to such an extent that if some planks are in oblique position, no edges or connecting parts will project beyond the wall line and there will be no chance for passing vessels to become hooked thereto. Impacts created by vessels will then be transmitted directly to the web and never to the ends of the flanges whereby damage to the vessels or piling due to hooking up to connecting members is prevented. The curve may be regular or irregular, arclike or polygonal.

By way of example, the invention is illustrated in the accompanying drawing which shows several constructional embodiments thereof in system lines.

Figure 1:
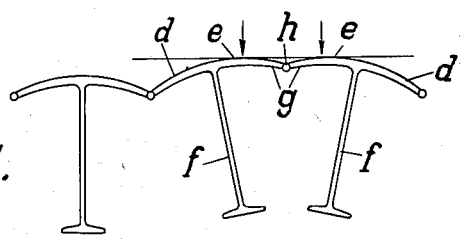
Figure 1 shows an I-shaped sheet piling having arclike curved flanges $d$. Contact between a vessel and the wall can take place only at the points $e$ near the webs $f$, as the ends $g$ of the flanges and the connecting parts $h$ are fully protected by being located behind the outer surface of the wall.
Figure 2:
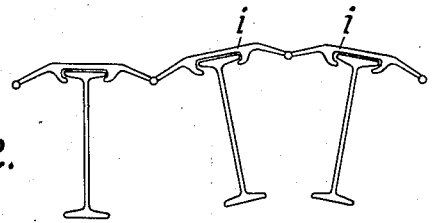
Figure 2 shows an I-shaped sheet piling having flanges $i$ with polygonal curving.
Figure 3:
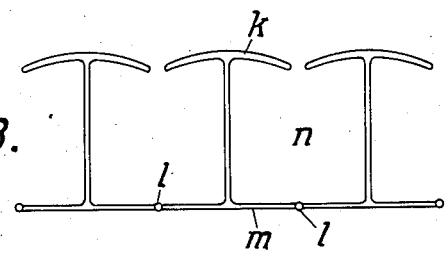
Figure 3 shows an I-shaped sheet piling possessing the curved flanges $k$ but the connection $l$ in the rear flanges $m$. To prevent gaps between the flanges $k$ the hollow space $n$ can be filled with concrete.

As shown, the curving of the flanges may be effected in various ways, and it is immaterial whether the I-shaped planks consist of a single rolled beam or of composite or welded parts. It is further immaterial whether the connection is rolled on directly or consists of special intermediate pieces or whether the connections are disposed on one or both sides of the wall or alternately on one and the other.

I claim:

1. Sheet piling located on waterways and consisting of I-like planks having two flanges, and lock-parts at the ends of one of the flanges adapted for connecting the single piles parallel to one another, the flange which lies at the outer zone of the piling wall being curved inwardly in a convex form so that the ends of the said outer flange lie behind the wall line even in an oblique position of the piles.

2. Sheet piling located on waterways and consisting of I-like planks of one piece having two flanges of unequal length and lock parts at the ends of that flange which lies at the outer zone of the piling wall and which is broader than the inner flange, the said lock parts being adapted for connecting the single planks parallel to one another, the said outer flange being curved inwardly in a convex form so that the ends of the said outer flange lie behind the wall line even in an oblique position of the piles.

WALTHER PRIELIPP.